US010572361B2

(12) United States Patent
Schuller et al.

(10) Patent No.: US 10,572,361 B2
(45) Date of Patent: Feb. 25, 2020

(54) CONCURRENT PRODUCTION USE OF A PRODUCTION ENTERPRISE SYSTEM AND TESTING OF A MODIFIED ENTERPRISE SYSTEM

(71) Applicant: The Boeing Company, Chicago, IL (US)

(72) Inventors: Erich Gunther Schuller, Maple Valley, WA (US); John Norris Benson, Bothell, WA (US); Sema Ustuntas, Redmond, WA (US)

(73) Assignee: THE BOEING COMPANY, Chicago, IL (US)

( * ) Notice: Subject to any disclaimer, the term of this patent is extended or adjusted under 35 U.S.C. 154(b) by 244 days.

(21) Appl. No.: 15/844,200

(22) Filed: Dec. 15, 2017

(65) Prior Publication Data

US 2018/0314625 A1 Nov. 1, 2018

Related U.S. Application Data

(60) Provisional application No. 62/491,311, filed on Apr. 28, 2017.

(51) Int. Cl.
  *G06F 11/277* (2006.01)
  *G06F 11/36* (2006.01)
  (Continued)

(52) U.S. Cl.
  CPC ........ *G06F 11/277* (2013.01); *G06F 11/3414* (2013.01); *G06F 11/3664* (2013.01); *G06F 8/65* (2013.01)

(58) Field of Classification Search
  CPC ............. G06F 11/2247; G06F 11/2289; G06F 11/261; G06F 11/263; G06F 11/277;
  (Continued)

(56) References Cited

U.S. PATENT DOCUMENTS

2008/0271019 A1* 10/2008 Stratton ............... G06F 21/577
                                                                718/1
2010/0257513 A1* 10/2010 Thirumalai ......... G06F 16/2365
                                                               717/134
(Continued)

FOREIGN PATENT DOCUMENTS

EP         3 131 041 A1    2/2017

OTHER PUBLICATIONS

Weber, Vincent (EP Primary Examination) Communication pursuant to Article 94(3) EPC dated May 20, 2019 corresponding EP Application No. 18166483.0.
(Continued)

*Primary Examiner* — Gabriel Chu
(74) *Attorney, Agent, or Firm* — MH2 Technology Law Group LLP (57) ABSTRACT

A method for concurrent production use of an enterprise system and testing of a modified enterprise system is provided. The method includes obtaining inputs from one or more users of a production enterprise system; providing the inputs from the one or more users to the production enterprise system; determining, by at least a hardware processor, a subset of the inputs from among the one or more users to use to test the modified enterprise system; performing, by at least the hardware processor, one or more transactions on the subset of the inputs on the modified enterprise system and a copy of the production enterprise system; and analyzing, by at least the hardware processor, the one or more transactions to determine that the modified enterprise system is correctly configured.

18 Claims, 5 Drawing Sheets

(51) Int. Cl.
*G06F 11/34* (2006.01)
*G06F 8/65* (2018.01)

(58) Field of Classification Search
CPC ............. G06F 11/3414; G06F 11/3428; G06F 11/3447; G06F 11/3457; G06F 11/3604; G06F 11/3664; G06F 11/3696; G06F 11/3684; G06F 11/3688; G06F 11/3692; G06F 8/60; G06F 8/65; G06F 8/70
See application file for complete search history.

(56) References Cited

U.S. PATENT DOCUMENTS

| | | | | |
|---|---|---|---|---|
| 2011/0161730 | A1* | 6/2011 | Van Der Merwe | ........................... G06F 11/3636 714/15 |
| 2012/0023371 | A1 | 1/2012 | Laengert et al. | |
| 2012/0051229 | A1* | 3/2012 | Feldmann | ................ H04L 43/04 370/242 |
| 2012/0144236 | A1* | 6/2012 | Black | .................... H04L 41/145 714/25 |
| 2013/0055026 | A1* | 2/2013 | Hatano | ................. G06F 11/263 714/32 |
| 2014/0229928 | A1* | 8/2014 | Edstrom | ................. G06F 8/656 717/171 |
| 2015/0089479 | A1* | 3/2015 | Chen | ................... G06F 11/3664 717/124 |
| 2016/0092330 | A1* | 3/2016 | Kosuda | ................. G06F 11/263 714/33 |
| 2016/0132420 | A1* | 5/2016 | Kuo | ..................... G06F 11/3684 717/130 |
| 2016/0155131 | A1* | 6/2016 | Miloslaysky | ........ G06Q 30/018 705/317 |
| 2016/0358109 | A1 | 12/2016 | Kruempelmann | |
| 2017/0046249 | A1* | 2/2017 | Oliver | ................ G06Q 10/0633 |
| 2017/0052879 | A1 | 2/2017 | Chandra et al. | |
| 2017/0199808 | A1* | 7/2017 | Campbell | ........... G06F 11/3664 |

OTHER PUBLICATIONS

Wikipedia, "Whitelist", https://en.wikipedia.org/wiki/Whitelist, 4 pages, date unknown, last edited on Nov. 24, 2017.
Wikipedia, "Baseline (Configuration Management)," https://en.wikipedia.org/wiki/Baseline_(configuration_management), 3 pages, date unknown, last edited on Dec. 9, 2017.
Debian, "How to Duplicate TCP Traffic to One or Multiple Remote Servers for Benchmarking Purposes?," https://serverfault.com/questions/570761/how-to-duplicate-tcp-traffic-to-one-or-multiple-remote-servers-for-benchmarking, 5 pages, date unknown, last edited on May 23, 2014.
Extended European Search Report dated Aug. 3, 2018 in corresponding EP Application No. 18166483.0.

* cited by examiner

CONCURRENT PRODUCTION USE OF A PRODUCTION ENTERPRISE SYSTEM AND TESTING OF A MODIFIED ENTERPRISE SYSTEM

CROSS REFERENCE TO RELATED APPLICATIONS

This application claims benefit of priority to U.S. Provisional Application No. 62/491,311 filed on Apr. 28, 2017, which is hereby incorporated by reference in its entirety.

FIELD

The present disclosure relates generally to an enterprise testing system.

BACKGROUND

Enterprise software systems (enterprise systems) can be used to perform enterprise-level operations. Example enterprise systems can include enterprise resource planning (ERP) systems, client-relationship management (CRM) systems, product lifecycle management (PLM) systems, supply chain management (SCM) systems, and supplier relationship management (SRM) systems. In a production environment, numerous users interact with an enterprise system daily, resulting in hundreds, if not thousands of transactions, and relatively large amounts of data. In some instances, enterprise systems, can be updated and/or customized. For example, a more recent version of an enterprise system may be available, resulting in an update to the enterprise system (e.g., updating from version 1.0 to version 2.0). As another example, an enterprise can customize an enterprise system to include functionality/features that are relevant to the particular enterprise.

In cases of updating and/or customizing (modifying) of an enterprise system the modified enterprise system is tested before being made available for production use. In some examples, testing is performed using production data (e.g., data provided from production use of the enterprise system before updating/customizing). Traditionally, shadow testing of the modified enterprise system is achieved by copying the production system (or tenant, if the software is tenant enabled) to an empty system (or tenant) and begin testing with semi-production data. This, however, has several disadvantages.

For example, the setup of such a test system requires copying of the entire production system, which might consume significant memory (e.g., up to several terabytes (TB)). Further, the copy-procedure may require a significant amount of time (e.g., a few hours to several days). During this time, the production use of the source system would create inconsistent data within the copy. Consequently, production use of the system is either halted, leading to significant downtime, or the testing is performed using inconsistent data. A further disadvantage is that, until the new system is performing exactly as the old system, the data will diverge and produce errors that make it difficult to identify the root cause of the issue. Additionally, traditional shadow testing requires that all transactions run in the origin system also get run in the test system, making targeted testing difficult.

Thus, a heretofore unaddressed need exists in the industry to address the aforementioned deficiencies and inadequacies.

SUMMARY

According to examples of the present disclosure, a method for concurrent production use of an enterprise system and testing of a modified enterprise system is provided. The method comprises obtaining inputs from one or more users of a production enterprise system; providing the inputs from the one or more users to the production enterprise system; determining, by at least a hardware processor, a subset of the inputs from among the one or more users to use to test the modified enterprise system; performing, by at least the hardware processor, one or more transactions on the subset of the inputs on the modified enterprise system and a copy of the production enterprise system; and analyzing, by at least the hardware processor, the one or more transactions to determine that the modified enterprise system is correctly configured.

According to examples of the present disclosure, a system for concurrent production use of an enterprise system and testing of a modified enterprise system is provided. The system comprises one or more processors; and a memory system comprising one or more computer-readable media, wherein the one or more computer-readable media contain instructions that, when executed by the one or more processors, cause the one or more processors to perform operations comprising: obtaining inputs from one or more users of a production enterprise system; providing the inputs from the one or more users to the production enterprise system; determining a subset of the inputs from among the one or more users to use to test a modified enterprise system; performing one or more transactions on the subset of the inputs on the modified enterprise system and a copy of the production enterprise system; and analyzing the one or more transactions to determine that the modified enterprise system is correctly configured.

According to examples of the present disclosure, a non-transitory computer readable storage medium for concurrent production use of an enterprise system and testing of a modified enterprise system is provided. The non-transitory computer readable storage medium comprising instructions for causing one or more processors to perform a method comprising: obtaining inputs from one or more users of a production enterprise system; providing the inputs from the one or more users to the production enterprise system; determining, by at least a hardware processor, a subset of the inputs from among the one or more users to use to test the modified enterprise system; performing, by at least the hardware processor, one or more transactions on the subset of the inputs on the modified enterprise system and a copy of the production enterprise system; and analyzing, by at least the hardware processor, the one or more transactions to determine that the modified enterprise system is correctly configured.

In some examples, the determining is based on a whitelist, wherein the whitelist comprises one or more of: a list of users to be used for the testing, a list of commands to be used for the testing, a list of transactions to be used for the testing.

In some examples, subsequent to the obtaining, the method comprises copying the inputs to be provided to the production enterprise system, the modified enterprise system, and the copy of the production enterprise system.

In some examples, the method further comprises synchronizing the modified enterprise system and the copy of the production enterprise system with the production enterprise system.

In some examples, the synchronizing occurs during a predetermined time interval or on demand.

In some examples, the analyzing further comprises comparing a record of transactions for the copy of the production enterprise system and the modified enterprise system.

It is to be understood that both the foregoing general description and the following detailed description are exemplary and explanatory only and are not restrictive of the implementations, as claimed.

DETAILED DESCRIPTION

Reference will now be made in detail to example implementations, which are illustrated in the accompanying drawings. When appropriate, the same reference numbers are used throughout the drawings to refer to the same or like parts.

For simplicity and illustrative purposes, the principles of the present disclosure are described by referring mainly to exemplary implementations thereof. However, one of ordinary skill in the art would readily recognize that the same principles are equally applicable to, and can be implemented in, all types of information and systems, and that any such variations do not depart from the true spirit and scope of the present disclosure. Moreover, in the following detailed description, references are made to the accompanying figures, which illustrate specific exemplary implementations. Electrical, mechanical, logical and structural changes may be made to the exemplary implementations without departing from the spirit and scope of the present disclosure. The following detailed description is, therefore, not to be taken in a limiting sense and the scope of the present disclosure is defined by the appended claims and their equivalents.

Implementations of the present disclosure are generally directed to testing modified enterprise systems without disturbing a corresponding production enterprise system. More specifically, implementations of the present disclosure are directed to testing updates to and/or customization of an enterprise system with production data using a test database schema in parallel with a production database schema. In some examples, implementations of the present disclosure enable testing and production use of an enterprise system to be performed on the same data duplicated to additional databases which may or may not use the same schema as the original database. By capturing actual usage of a current production system in real time and using that capture usage to test a newly developed system against a legacy test system, an accurate comparison can be provided of the new system to the legacy system (both data integrity and performance) by reusing those exact production transactions for those exact production users in the same way on both the legacy test system and the updated test system, without requiring all transactions to be run. Also, by using the actual production interactions of the end users, the system is able to eliminate the majority of dedicated time for end user testing while providing the best representation of production usage on the test system. This includes types of interactions as well as system load and scaling. This also allows for better testing of error conditions, automated generation of unit tests and automated analytics on the testing data.

Figure 1:
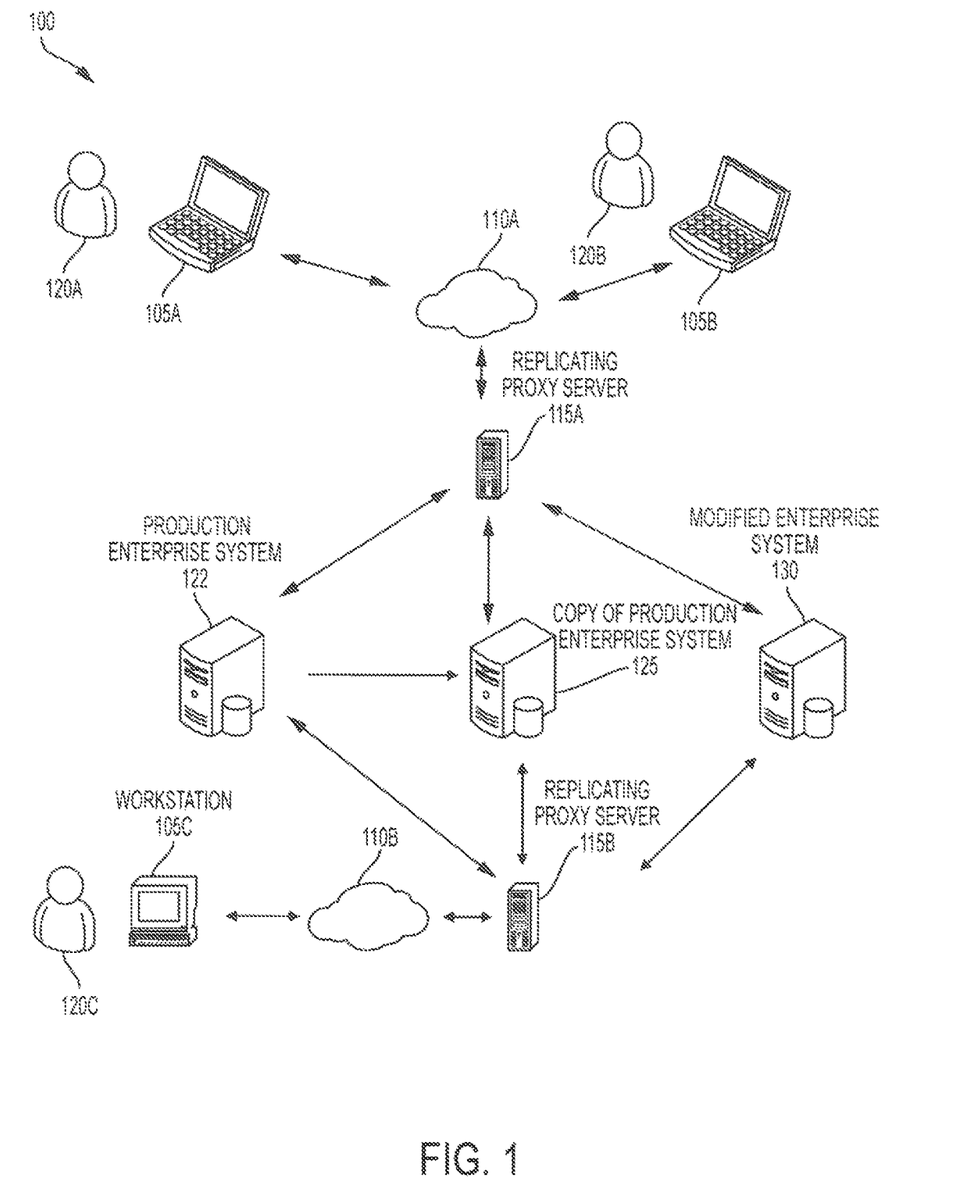
FIG. 1 depicts a testing architecture, according to examples of the present disclosure.

FIG. 1 depicts a testing architecture 100, according to examples of the present disclosure. The testing architecture 100 can be used to test a production enterprise system 122 (or production system), e.g., production enterprise server, where the architecture 100 intercepts production server usage and selectively re-uses the interactions for testing on an modified enterprise system 130 (or test system), e.g., an updated server system, and compares results against a copy of the production enterprise system 125, e.g., a test legacy server, which provides for a reduction in testing user error, an elimination of vast majority of end user testing, and an elimination of duplicate data entry and the errors this brings. The testing architecture 100 includes client devices 105A and 105B that are communicatively connected to a replicating proxy server 115A by a network 110A and client device 105C that is communicatively connected to a replicating proxy server 115B by a network 110B. The client devices 105A, 105B are operated by users 120A, 120B, respectively, and the client device 105C is operated by a user 120C. In some examples, the network 110A and the network 110B are different networks, such a network 110A being an external wide area network, i.e., the internet, and the network 110B being an internal local area network. In some examples, the client devices 105A, 105B, 105C can each be a computing device such as a laptop computer, a desktop computer, a smartphone, a personal digital assistant, a portable media player, a tablet computer, or any other appropriate computing device that can be used to communicate with the replicating proxy server 115A, 115B. The replicating proxy servers 115A, 115B are communicatively connected to the production enterprise system 122, the copy of the production enterprise system 125, and the modified enterprise system 130. The replicating proxy servers 115A, 115B obtains data from client devices 105A, 105B, and 105C and provides that data to the production enterprise system 122 for use in the normal course of the work by users 120A, 120B, 120C, as well as, provides the data for testing using the copy of the production enterprise system 125 and modified enterprise system 130.

In some examples, the replicating proxy servers 115A, 115B can be separate servers or can be a service hosted by either the production enterprise system 122, the copy of the production enterprise system 125, or the modified enterprise system 130. In some examples, the replicating proxy servers 115a, 115b, the production enterprise system 122, the copy of the production enterprise system 125, and the modified enterprise system 130 can include one or more computing devices, such as a server, and one or more database systems. In some examples, the replicating proxy server 115A, 115B can represent more than one computing device working together to perform the actions of a server (e.g., cloud computing). In some implementations, the database system can be provided as an in-memory database system. In some examples, an in-memory database is a database management system that uses main memory for data storage. In some examples, main memory includes random access memory (RAM) that communicates with one or more processors (e.g., central processing units (CPUs)) over a memory bus. In-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage database systems.

Figure 2:
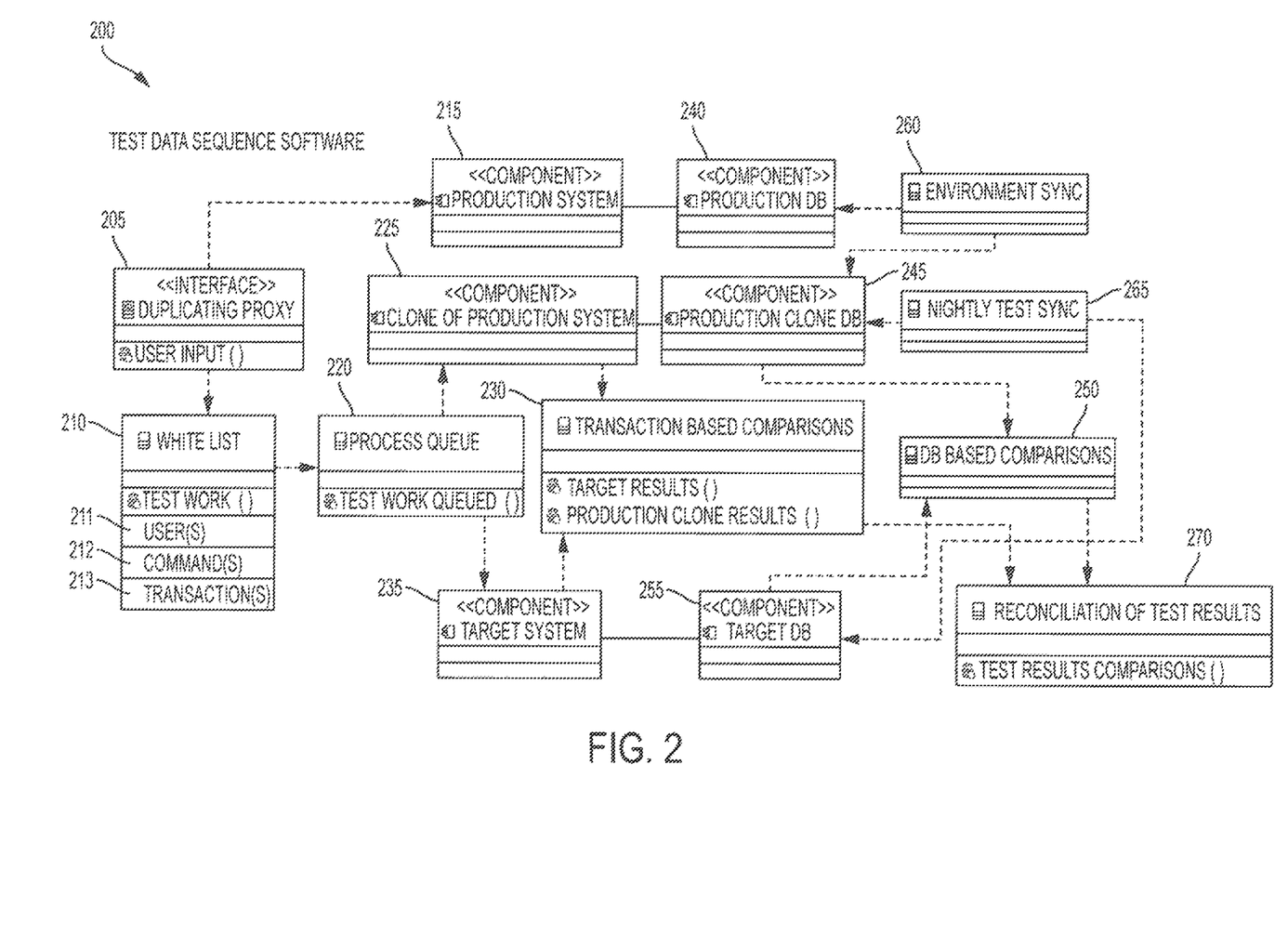
FIG. 2 depicts a test data sequence software diagram, according to examples of the present disclosure.

FIG. 2 depicts a test data sequence software diagram 200, according to examples of the present disclosure. The replicating proxy servers 115A, 115B obtains inputs 205 from the users 120A, 120B, and 120C via the respective client devices 105A, 105B, 105C. The replicating proxy servers 115A, 115B contains a queue 210 of user inputs that are filtered through a whitelist 210 to be used to test the modified enterprise system 130 by comparing results against the copy of the production system 125. The white list 210, as shown in FIG. 2, is a transaction queue which is the full list of user(s) 211, command(s) 212, and transaction(s) 213 to be used for testing from the production users, state machine which keeps track of the state of session groups (each session group includes the production session and the two test sessions) and white list which determines which transactions to process against the test sessions (which is why the test session states can vary from the production session state). The user inputs include command(s) 212 for performing one or more actions, including but are not limited to, retrieving, editing, updating, joining, re-assigning drawings, reporting, and other actions for whatever information is stored and manipulated by the production enterprise system 122. The transaction(s) 213 can be instructions from the respective client devices 105A, 105B, 105C to the production enterprise system 122 to initiate the command. For example, a web service for managing users can include application program interface (API) commands including, but are not limited to, GetByName(Name)→EmployeeID/Fail (on white list 210), GetByID(ID)→Employee NameFail (on white list 210), Set(Name)→Generated ID/Fail (II) is automatically generated) (not on white list 210). The list of transactions can be arranged in a database as a single table of two columns (Id, Name) and the symbol "*" can represent transaction not processed because it was not whitelisted. The whitelist 210 can typically produce a subset of the inputs that the users 120A, 120B, 120C would use during a normal work environment for execution against the test systems, including the copy of the production enterprise system 125 and the modified enterprise system 130. Additionally, the white list 210 can include a listing of which users, e.g., users 120A, 120B, 120C, to include in the testing architecture. For example, if the users 120A and 120B, but not the user 120C, are used for testing, then inputs provided to the client devices 105A and 105B, but not the client device 105C, are directed from the replicating proxy server 115A to the copy of the production enterprise system 125 and the modified enterprise system 130. Additionally, the white list 210 can include one or more transaction that are to be performed by the copy of the production system 125 and the modified enterprise system 130 based on the subset of inputs and the users selected to be tested.

The replicating proxy servers 115A, 115B provides the inputs 205 to the production enterprise system 122, which is communication with a production database 240, to be used for normal workflow. The subset of inputs obtained from the white list 210 is provided to a process queue 220 to be used to test a target system 235, i.e., the modified enterprise system 130, and a target database 255 against the clone of the production system 225, i.e., the copy of production enterprise system 125, and a production clone database 245. During the test, transaction-based comparisons 230 are made between the clone of the production system 225 and the target system 235 and database-based comparisons 250 are made between the production clone database 245 and the target database 255 for the subset of inputs and are provided as a reconciliation of test results 270. The production clone database 245 and the target database 255 are synchronized with the production database 240 using an environment synchronization 260. This ensure that any changes in records in the production database 240 are propagated to the production clone database 245 and the target database 255. Also, on a periodic basis, i.e., every night during a specified time frame, the production clone database 245 can be synchronized with the production database 240 using an environmental synchronization 260 and a periodic test synchronization 265. The periodic test synchronization 265 is more frequent than the environmental synchronization 260 and is to make sure that the production clone database 245 and the target database 255 stay closely in synch to assure test quality. The environmental synchronization 260 is less frequent and is to bring the production clone database 245 and the target database 255 into sync with the production data because only a subset of the production transactions are being run against the test system.

Figure 3:
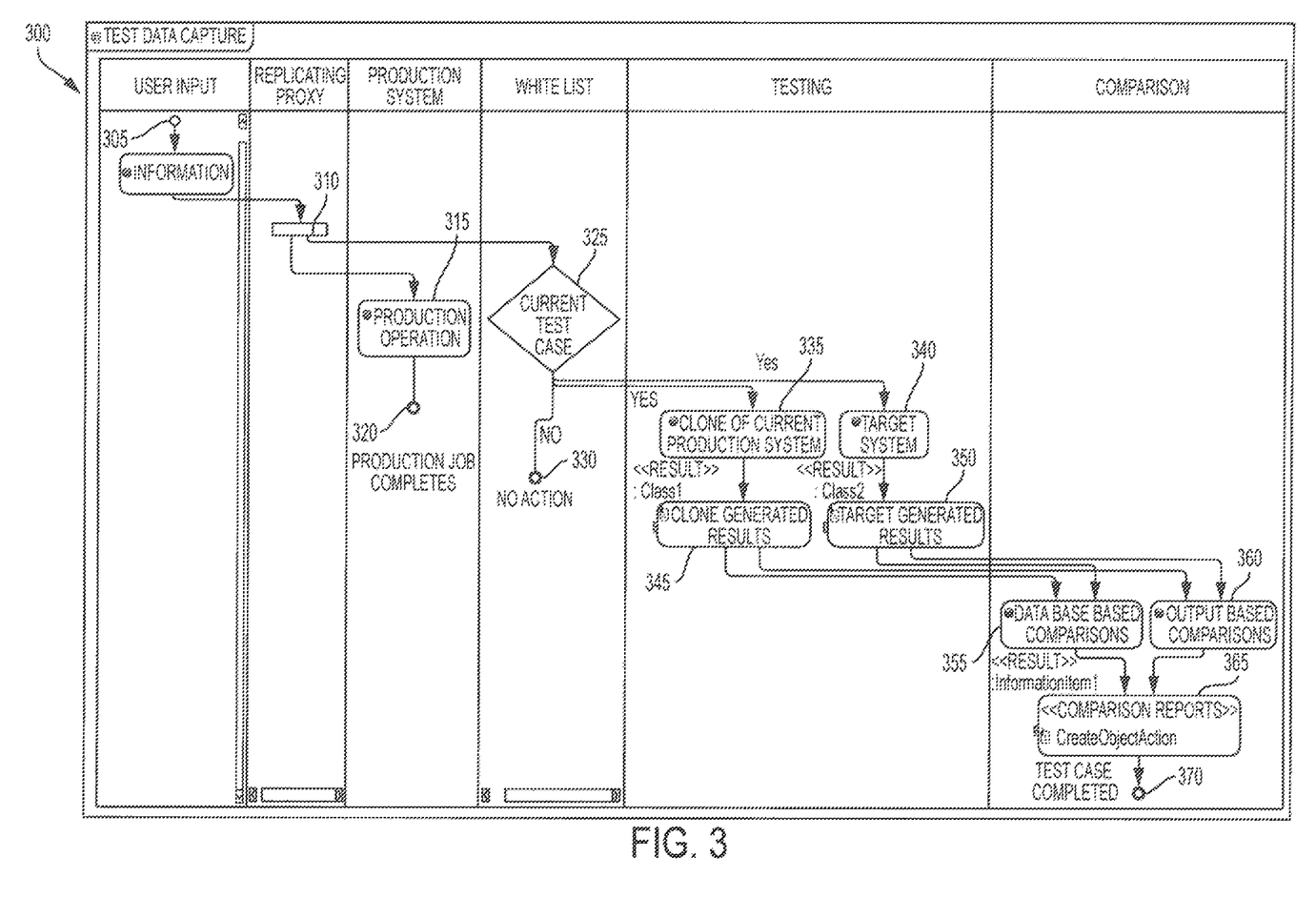
FIG. 3 depicts a process for the testing the target system, according to examples of the present disclosure.

FIG. 3 depicts a process for the testing the target system 300, according to examples of the present disclosure. At 305, input(s) are received from a client device, i.e., the client devices 105A, 105B, 105C, obtained from user(s), i.e., the users 120A, 120B, and 120C. The input(s) are obtained from user(s) during their normal daily work. At 310, a replicating proxy, i.e., the replicating proxy server 115A, 115B, duplicates the input(s). The replicating proxy duplicates all the inputs, which are then filtered by the white list 210. The duplication of all the inputs improves test documentation while minimizing the potential of impact to user experience by keeping replication proxy as light weight as possible. Even if the users are not approved test system users, their transactions are duplicated and stored and are then filtered out by the white list 210. At 315, a production system, i.e., the production enterprise system 122, receives the input(s) from the replicating proxy to be used for normal work. At 315, the production enterprise system 122 processes the input(s) in a normal manner until the production job completes at 320. At 325, the input(s) that were duplicated by the replicating proxy are compared against a list of transactions approved for the test system. For example, a white list. i.e., the white list 210, can include one or more transactions on which to perform on the clone of the production system 225 and the target system 235 based on a subset of input(s) from one or more of the user(s) selected from all of the production transactions that were cloned. If there is no current test case, the transaction is added to the transactions table and marked as either whitelisted or blacklisted based on test system configuration. If there is a current test case and the transaction is whitelisted, then the transaction is performed in parallel on the clone of the production system 225 at 335 and the target system 235 at 340. The respective results of the one or more transactions 345 and 350 are compared at 355 and 360 using, for example, comparison tools that are tailored to evaluate a specific output and generate a binary level comparison flag for any differences produced. At 365, a comparison report is generated and the test case is completed at 370.

Figure 4:
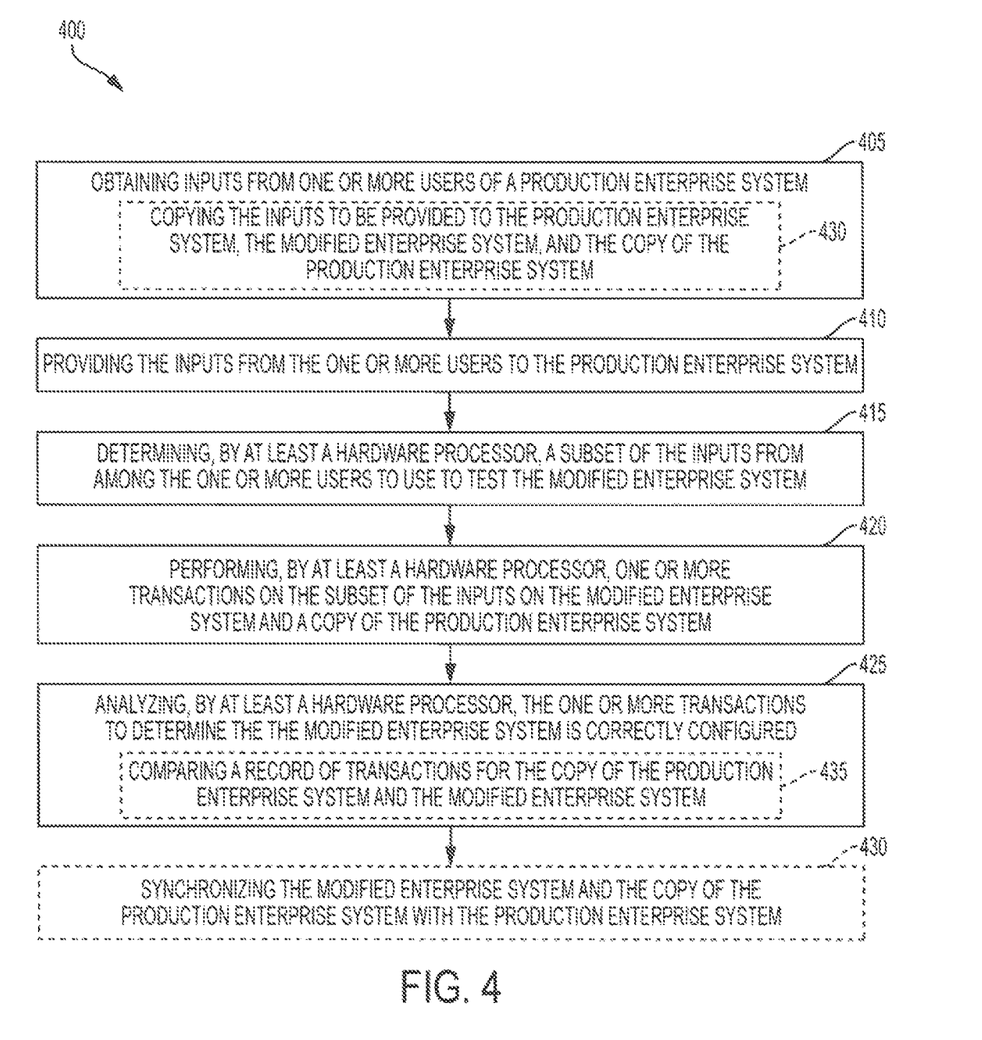
FIG. 4 shows a method for concurrent production use of an enterprise system and testing of a modified enterprise system, according to examples of the present disclosure.

FIG. 4 shows a method 400 for concurrent production use of an enterprise system 122 and testing of a modified enterprise system 130, according to examples of the present disclosure. The method begins by obtaining, at 405, inputs from one or more users 120A, 120B, 120C of a production enterprise system 122. The method continues by providing, at 410, the inputs from the one or more users to the production enterprise system 122. The method continues by determining, at 415, by at least a hardware processor, a subset of the inputs from among the one or more users to use to test the modified enterprise system. The determining is based on a whitelist 210, wherein the whitelist comprises one or more of: a list of users (120A, 120B, 120C) to be used for the testing, a list of commands 212 to be used for the testing, a list of transactions 213 to be used for the testing. The method continues by performing, at 420, by at least a hardware processor, one or more transactions on the subset of the inputs on the modified enterprise system 130 and a copy of the production enterprise system 125. The method continues by analyzing, at 425, by at least a hardware processor, the one or more transactions to determine that the modified enterprise system 130 is correctly configured.

In some examples, the method can, subsequent to the obtaining, at 405, optionally perform operations including copying, at 430, the inputs to be provided to the production enterprise system 122, the modified enterprise system 130, and the copy of the production enterprise system 125.

In some examples, the method can optionally perform operations including synchronizing, at 430, the modified enterprise system 130 and the copy of the production enterprise system 125 with the production enterprise system 122, wherein the synchronizing occurs during a predetermined time interval or on demand.

In some examples, the analyzing, at 425, can further include comparing, at 435, a record of transactions for the copy of the production enterprise system 125 and the modified enterprise system 130.

Figure 5:
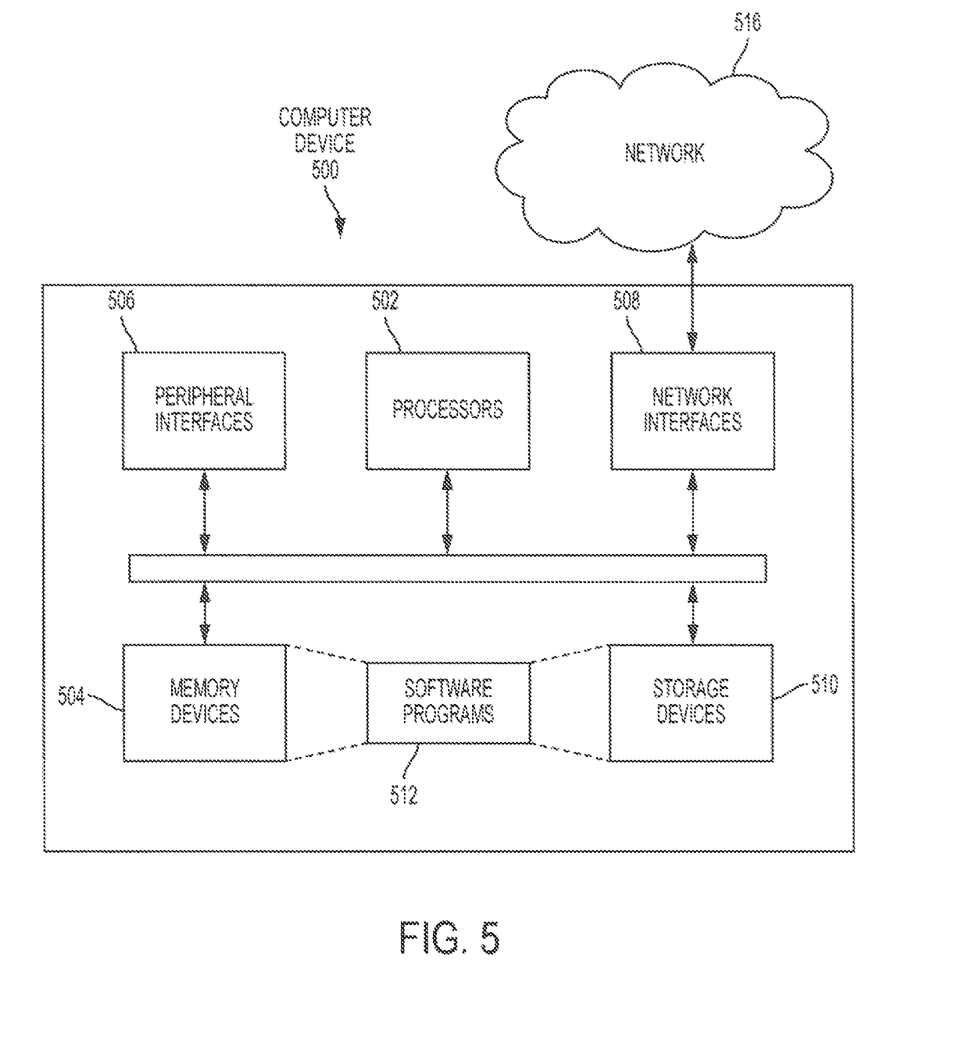
FIG. 5 is an example computer system for performing the disclosed implementations, consistent with the present disclosure.

FIG. 5 illustrates an example of a hardware configuration for a computer device 500 that can be used as mobile device or server, which can be used to perform one or more of the processes described above. While FIG. 5 illustrates various components contained in the computer device 500, FIG. 5 illustrates one example of a computer device and additional components can be added and existing components can be removed.

The computer device 500 can be any type of computer devices, such as desktops, laptops, servers, etc., or mobile devices, such as smart telephones, tablet computers, cellular telephones, personal digital assistants, etc. As illustrated in FIG. 5, the computer device 500 can include one or more processors 502 of varying core configurations and clock frequencies. The computer device 500 can also include one or more memory devices 504 that serve as a main memory during the operation of the computer device 500. For example, during operation, a copy of the software that supports the operations can be stored in the one or more memory devices 504. The computer device 500 can also include one or more peripheral interfaces 506, such as keyboards, mice, touchpads, computer screens, touchscreens, etc., for enabling human interaction with and manipulation of the computer device 500.

The computer device 500 can also include one or more network interfaces 508 for communicating via one or more networks, such as Ethernet adapters, wireless transceivers, or serial network components, for communicating over wired or wireless media using protocols. The computer device 500 can also include one or more storage device 510 of varying physical dimensions and storage capacities, such as flash drives, hard drives, random access memory, etc., for storing data, such as images, files, and program instructions for execution by the one or more processors 502.

Additionally, the computer device 500 can include one or more software programs 512 that enable the functionality described above. The one or more software programs 512 can include instructions that cause the one or more processors 502 to perform the processes described herein. Copies of the one or more software programs 512 can be stored in the one or more memory devices 504 and/or on in the one or more storage devices 510. Likewise, the data used by one or more software programs 512 can be stored in the one or more memory devices 504 and/or on in the one or more storage devices 510.

In implementations, the computer device 500 can communicate with other devices via a network 516. The other devices can be any types of devices as described above. The network 516 can be any type of electronic network, such as a local area network, a wide-area network, a virtual private network, the Internet, an intranet, an extranet, a public switched telephone network, an infrared network, a wireless network, and any combination thereof. The network 516 can support communications using any of a variety of commercially-available protocols, such as TCP/IP, UDP, OSI, FTP, UPnP, NFS, CIFS, AppleTalk, and the like. The network 516 can be, for example, a local area network, a wide-area network, a virtual private network, the Internet, an intranet, an extranet, a public switched telephone network, an infrared network, a wireless network, and any combination thereof.

The computer device 500 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 500 as described above need not be enclosed within a single enclosure or even located in close proximity to one another. Those skilled in the art will appreciate that the above-described componentry are examples only, as the computer device 500 can include any type of hardware componentry, including any necessary accompanying firmware or software, for performing the disclosed implementations. The computer device 500 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

Those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

The foregoing description of the disclosure, along with its associated embodiments, has been presented for purposes of illustration only. It is not exhaustive and does not limit the disclosure to the precise form disclosed. Those skilled in the art will appreciate from the foregoing description that modifications and variations are possible in light of the above teachings or may be acquired from practicing the disclosure. For example, the steps described need not be performed in the same sequence discussed or with the same degree of separation. Likewise various steps may be omitted, repeated, or combined, as necessary to achieve the same or similar objectives. Similarly, the systems described need not necessarily include all parts described in the embodiments, and may also include other parts not describe in the embodiments.

Accordingly, the disclosure is not limited to the above-described embodiments, but instead is defined by the appended claims in light of their full scope of equivalents.

What is claimed is:

1. A method (300) for concurrent production use of a production enterprise system (122) and testing of a modified enterprise system (130), the method comprising:
    obtaining (405) inputs from one or more users (120A, 120B, 120C) of a production enterprise system (122);
    providing (410) the inputs from the one or more users (120A, 120B, 120C) to the production enterprise system (122);
    determining (415), by at least a hardware processor (502), a subset of the inputs from among the one or more users (120A, 120B, 120C) to use to test a modified enterprise system (130);
    performing (420), by at least the hardware processor (502), one or more transactions on the subset of the inputs on the modified enterprise system (130) and a copy of the production enterprise system (125); and
    analyzing (425), by at least the hardware processor (502), the one or more transactions to determine that the modified enterprise system (130) is correctly configured.

2. The method of claim 1, wherein the determining is based on a whitelist (210), wherein the whitelist comprises one or more of: a list of users (120A, 120B, 120C) to be used for the testing, a list of commands (212) to be used for the testing, a list of transactions (213) to be used for the testing.

3. The method of claim 1, further comprising, subsequent to the obtaining (405), copying (430) the inputs to be provided to the production enterprise system (122), the modified enterprise system (130), and the copy of the production enterprise system (125).

4. The method of claim 1, further comprising synchronizing (430) the modified enterprise system (130) and the copy of the production enterprise system (125) with the production enterprise system (122).

5. The method of claim 4, wherein the synchronizing (430) occurs during a predetermined time interval or on demand.

6. The method of claim 1, wherein the analyzing (425) further comprising comparing (435) a record of transactions for the copy of the production enterprise system (125) and the modified enterprise system (130).

7. A system for concurrent production use of an enterprise system and testing of a modified enterprise system (130), the system comprising:
one or more processors (502); and
one or more computer-readable media (504, 510), wherein the one or more computer-readable media (504, 510) contain instructions that, when executed by the one or more processors (502), cause the one or more processors (502) to perform operations comprising:
obtaining (405) inputs from one or more users (120A, 120B, 120C) of a production enterprise system;
providing (410) the inputs from the one or more users (120A, 120B, 120C) to the production enterprise system;
determining (415) a subset of the inputs from among the one or more users (120A, 120B, 120C) to use to test a modified enterprise system (130);
performing (420) one or more transactions on the subset of the inputs on the modified enterprise system (130) and a copy of the production enterprise system (125); and
analyzing (425) the one or more transactions to determine that the modified enterprise system (130) is correctly configured.

8. The system of claim 7, wherein the determining is based on a whitelist, wherein the whitelist comprises one or more of: a list of users (120A, 120B, 120C) to be used for the testing, a list of commands (212) to be used for the testing, a list of transactions (213) to be used for the testing.

9. The system of claim 7, wherein the one or more processors (502) are further operable to perform operations comprising, subsequent to the obtaining (405), copying (430) the inputs to be provided to the production enterprise system (122), the modified enterprise system (130), and the copy of the production enterprise system (125).

10. The system of claim 7, wherein the one or more processors (502) are further operable to perform operations comprising synchronizing (430) the modified enterprise system (130) and the copy of the production enterprise system (125) with the production enterprise system (122).

11. The system of claim 10, wherein the synchronizing (430) occurs during a predetermined time interval or on demand.

12. The system of claim 7, wherein the analyzing (425) further comprising comparing (435) a record of transactions for the copy of the production enterprise system (125) and the modified enterprise system (130).

13. A non-transitory computer readable storage medium (504, 510) for concurrent production use of a production enterprise system (122) and testing of a modified enterprise system 130), the non-transitory computer readable storage medium comprising instructions for causing one or more processors (502) to perform a method comprising:
obtaining (405) inputs from one or more users (120A, 120B, 120C) of a production enterprise system (122);
providing (410) the inputs from the one or more users (120A, 120B, 120C) to the production enterprise system (122);
determining (415), by at least a hardware processor (502), a subset of the inputs from among the one or more users (120A, 120B, 120C) to use to test the modified enterprise system (130);
performing (420), by at least the hardware processor (502), one or more transactions on the subset of the inputs on the modified enterprise system (130) and a copy of the production enterprise system (125); and
analyzing (425), by at least the hardware processor, the one or more transactions to determine that the modified enterprise system (130) is correctly configured.

14. The non-transitory computer readable storage medium of claim 13, wherein the determining (415) is based on a whitelist (210), wherein the whitelist (210) comprises one or more of: a list of users (120A, 120B, 120C) to be used for the testing, a list of commands to be used for the testing, a list of transactions to be used for the testing.

15. The non-transitory computer readable storage medium of claim 13, further comprising, subsequent to the obtaining (405), copying (430) the inputs to be provided to the production enterprise system (122), the modified enterprise system (130), and the copy of the production enterprise system (125).

16. The non-transitory computer readable storage medium of claim 13, further comprising synchronizing (440) the modified enterprise system (130) and the copy of the production enterprise system (125) with the production enterprise system (122).

17. The non-transitory computer readable storage medium of claim 16, wherein the synchronizing (430) occurs during a predetermined time interval or on demand.

18. The non-transitory computer readable storage medium of claim 13, wherein the analyzing (425) further comprising comparing (435) a record of transactions for the copy of the production enterprise system (125) and the modified enterprise system (130).

* * * * *